(12) United States Patent
Wong et al.

(10) Patent No.: US 6,745,332 B1
(45) Date of Patent: Jun. 1, 2004

(54) METHOD AND APPARATUS FOR ENABLING DATABASE PRIVILEGES

(75) Inventors: Daniel M. Wong, Sacramento, CA (US); Chon H. Lei, San Leandro, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/342,312

(22) Filed: Jun. 29, 1999

(51) Int. Cl.$^7$ .............................. G06F 11/30; H04L 9/00
(52) U.S. Cl. ...................... 713/201; 713/202; 713/164; 713/161
(58) Field of Search ................... 713/201–202, 713/164, 161; 707/7, 8, 9, 10

(56) References Cited

U.S. PATENT DOCUMENTS

| | | | | |
|---|---|---|---|---|
| 5,450,581 A | * | 9/1995 | Bergen et al. ................. 707/9 |
| 5,684,951 A | | 11/1997 | Goldman et al. ...... 395/188.01 |
| 5,884,316 A | * | 3/1999 | Bernstein et al. ....... 707/103 R |
| 5,899,987 A | * | 5/1999 | Yarom ........................... 707/3 |
| 6,145,086 A | * | 11/2000 | Bellemore et al. .......... 713/202 |
| 6,289,462 B1 | * | 9/2001 | McNabb et al. ............ 713/201 |
| 6,490,591 B1 | | 12/2002 | Denbar et al. | |
| 6,507,817 B1 | | 1/2003 | Wolfe et al. | |
| 2002/0083073 A1 | | 6/2002 | Vaidya et al. | |

OTHER PUBLICATIONS

Oracle8 Server Concepts, "Privileges and Roles" Release 8.0, vol. 2, Jun. 1997, pp. 25-1 through 25-15.

* cited by examiner

Primary Examiner—Thomas R. Peeso
Assistant Examiner—G. Gurshman
(74) Attorney, Agent, or Firm—Bingham McCutchen LLP

(57) ABSTRACT

Methods for enabling database privileges are provided. The methods eliminate strict dependency on tradition password, or "secret" based security systems. Instead, database privileges are enabled based on verifying information stored in one or more frames of a call stack corresponds to trusted security logic. In another embodiment, database privileges are enabled based on policies identified in the trusted security logic. The methods and techniques described herein provide a flexible and extensible mechanisms for verifying that trusted security logic has been executed prior to enabling database privileges.

12 Claims, 8 Drawing Sheets

METHOD AND APPARATUS FOR ENABLING DATABASE PRIVILEGES

FIELD OF THE INVENTION:

The present invention relates generally to the field of database security, and more particularly to a method and apparatus for enabling database privileges.

BACKGROUND

In the field of database management systems, a database is often referred to as a server; that is, a program that provides services (e.g., via a plurality of processes) to one or more clients. The database generally contains a number of tables, each table having numerous rows and columns. A column is commonly referred to as a "field", and a given row and field pair is referred to herein as a "data cell". The data cell describes a particular attribute of the subject of a row.

One type of client is called an application program. An application program is a complete, self-contained program that performs a function directly for a user. As used with a database, the application program provides an interface to the data cells stored in the tables of the database.

An application program is advantageous to a user because the application program provides a simplified interface to the data stored in the database. The interface is simplified because users are generally not required to know complex structured query language ("SQL") commands that are used to extract data from the database. For example, the application program can provide a graphical user interface (e.g., a "form") with a series of prompts for query parameters. A user accessing the application program simply enters the query parameters and the application program invokes a SQL request that is processed by the database. The database will return the results of a query matching the user's query parameters to the application program.

As mentioned above, the database is often used as a repository of data information for a number of application programs. Each application program is often designed for a particular type of function and a particular class of user. For example, the database may include a table, the table containing information about employees of a corporation, such as: name, employee ID, social security number, salary, manager, work phone number, and home address.

All of the employees (users) in a corporation do not need full "write" privileges (i.e., the right to update, delete or modify) to the employee data. For this reason, a database may employ a security system to restrict user privileges to the data. For instance, an employee's manager may be granted privileges to read and modify the employee's salary, yet other employees of equal or "lower" rank may be restricted from such privileges by the security system.

FIG. 1 depicts a flow diagram of a secret-based database security system 100. The secret-based database security system 100 is employed to enable privileges to users for access to the data cells. A secret password is authenticated before database privileges are enabled to the users. In short, the secret password is the database's way of determining the identity of an end application (or user).

Often a separate application program is provided for creating, deleting or modifying data cells versus simply reading the cells in the same database. For instance, the employee's manager may update the employee's salary through a payroll application program that allows such database privileges to be granted only to a higher-ranking employee. Furthermore, the payroll application may only reveal certain fields to the employee's manager (e.g., the employee's home address may be withheld, but the employee's salary shown). However, in an electronic mail application, read-only privileges to the employee information table may be granted to all users for corporate directory purposes, but those privileges might restrict access to social security number, salary, and home address information.

In a typical secret-based database security system 100, when the user attempts to access the database through the application program, the application program may first request a password from the user. If the application program successfully authenticates the password, then the application program will establish a session with the database for the user. (As used herein, a "session" is a specific connection of a user to a database instance via a user process; a session lasts from the time the user connects to the database instance until the time the user disconnects from the database instance.) The application program, after establishing the session with the database, will cause an authentication process to be invoked, whereby a password that is hard-coded (or "embedded") into the application program, or requested directly from the user, will be supplied to the database security system 100 and presumably verified. If the password is successfully authenticated, then the appropriate database privileges are granted to the user.

If the user is denied privileges by using the application program, the user may attempt to establish an ad hoc query session with the database, thereby bypassing the application program. When establishing the ad hoc query session, the same security process is invoked. The authentication process prompts the user for a password and after the user responds, the database security system 100 authenticates the password by comparing the user response with a static password file. If the authentication is successful, then the user is granted privileges to the database.

Drawbacks exist with password, or so-called "secret-based" database security systems. One drawback is that the security is only as good as the password, and the password is only good so long as it is kept secret. Maintaining the password as a secret can be very difficult. For example, one user having privileges to the database can simply supply the password to another user who does not have equal privileges. Another possible breach can occur when an eavesdropper monitors a session and discovers the password, simply checks the application program code for the embedded password, or explores the static password table.

A possible solution is the use of powerful, computationally expensive, multi-bit encryption methodologies in conjunction with the password, such as the well-known Rivest-Shamir-Adleman ("RSA") or Message Digest 5 ("MD5") encryption algorithms. However, virtually all passwords and cryptographic methods can be broken. In today's highly distributed client-server systems allowing sessions to be established between tens of thousands of users and the server, it is possible to launch a parallel attack on the database to discover the password. Repeated assaults can be asserted from numerous locations until, eventually, the cryptographic key is discovered and the password is revealed.

Once the password is discovered, it will have to be changed. Users of the database will have to be notified of a new password(s), applications with the password hard-coded or embedded into them will have to modified, and new password tables will have to be created—all at significant effort to the database and/or application program administrator. The userid and password approach to database privilege enablement is not very flexible.

SUMMARY OF THE INVENTION

A method for enabling database privileges is provided. In one embodiment, the method comprises establishing a session on behalf of a user, receiving a request to enable database privileges for the user, and verifying trusted security logic has been executed prior to receiving the request to enable the database privileges. Database privileges for the user are enabled if the trusted security logic has been executed prior to receiving the request to enable the database privileges.

In a preferred embodiment, call information is stored in one or more frames of a call stack and the act of verifying includes determining whether at least one frame of the one or more frames of the call stack corresponds to the trusted security logic.

In another embodiment, the method comprises receiving a request to enable a role, generating a list of security policies associated with the role from a metadata repository, executing each security policy identified in the list, and returning a value indicating the successful or unsuccessful execution of each security policy. If the value returned by all the executed security policies indicates each was successful, then database privileges are enabled for the user.

A computer system configured to perform the methods and techniques described above is also provided.

BRIEF DESCRIPTION OF THE FIGURES:

Preferred embodiments of the present invention are depicted in the figures of the accompanying drawings by way of example, and not by way of limitation, in which.

DESCRIPTION OF THE PREFERRED EMBODIMENT

According to one embodiment of the present invention, a metadata repository (for example a data dictionary) comprises information identifying trusted security logic. This information can include an application name or a security logic or module name (for example a trusted package name) that must be executed prior to enablement of database privileges. When database privileges are requested, it is determined whether at least one of the frames of a call stack corresponds to the trusted security logic. If the information in at least one of the frames of the call stack corresponds to the trusted security logic, then database privileges are enabled.

In another embodiment, two types of metadata are stored in the metadata repository. A first type of metadata identifies the trusted application names through which a particular request to enable database privileges can be invoked, while a second type of metadata identifies the trusted security modules that must be executed prior to enablement. In still another embodiment, the metadata identifies trusted context attributes.

These and other embodiments of the invention are described in greater detail below. Other aspects and embodiments of the invention will be apparent to one of skill in the art after review of the flowcharts and schematics described herein. Accordingly, the specification is to be considered in an illustrative, rather than a restrictive sense.

HARDWARE OVERVIEW

Figure 1:
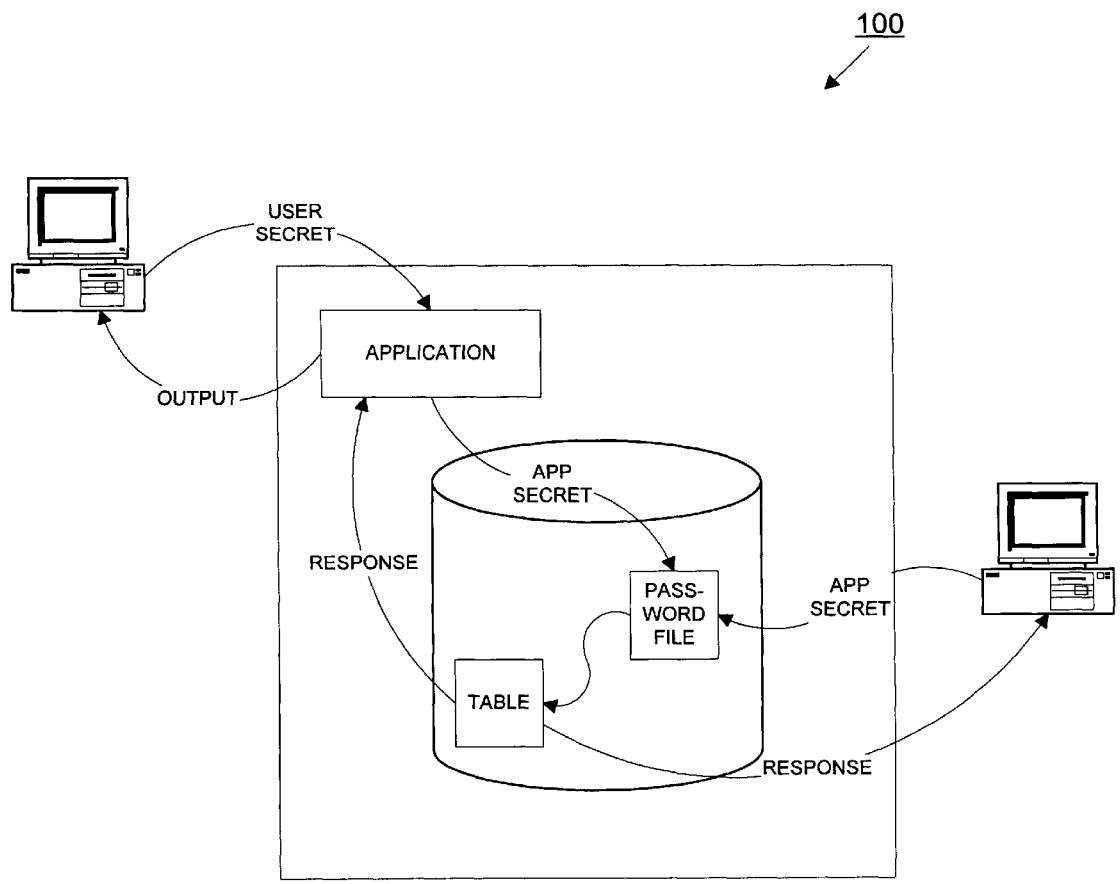
FIG. 1 depicts a flow diagram of a secret-based database security system.
Figure 2:
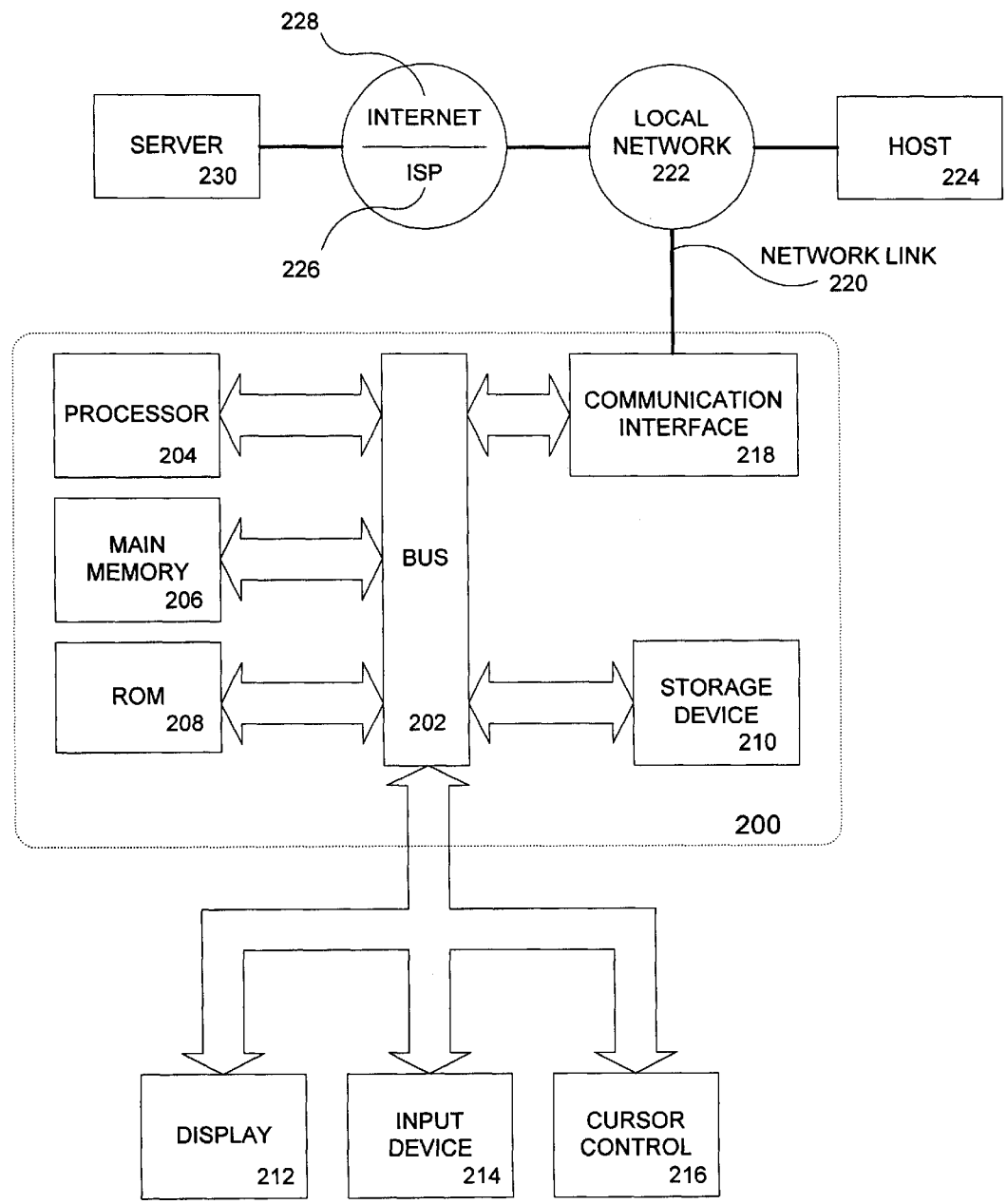
FIG. 2 depicts an embodiment of a computer system configured to employ the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory ("RAM") or other dynamic storage device, coupled to bus 202 for storing information and instructions to be executed by processor 204. Main memory 206 also may be used for storing temporary variables or other intermediate information during execution of instructions by processor 204. Computer system 200 further includes a read only memory ("ROM") 208 or other static storage device coupled to bus 202 for storing static information and instructions for processor 204. A storage device 210, such as a magnetic disk or optical disk, is provided and coupled to bus 202 for storing information such as data structures and instructions.

Computer system 200 may be coupled via bus 202 to a display 212, such as a cathode ray tube ("CRT"), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for enabling database privileges for a role. According to one embodiment of the invention, database privileges are provided by computer system 200 in response to processor 204 executing one or more sequences of instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, ROM, a FLASH, or any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network ("ISDN") card or a modem to provide a data communication connection to a corresponding type of telephone line. As another example, communication interface 218 may be a local area network ("LAN") card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider ("ISP") 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for a method for enabling database privileges as described herein.

The received code may be executed by processor 204 as it is received, and/or stored in storage device 210, or other non-volatile storage for later execution. In this manner, computer system 200 may obtain application code in the form of a carrier wave. The computer 200 can be employed as single function input output device, or it can be configured to function as a sever, such as a database server or an application server or both.

Figure 3:
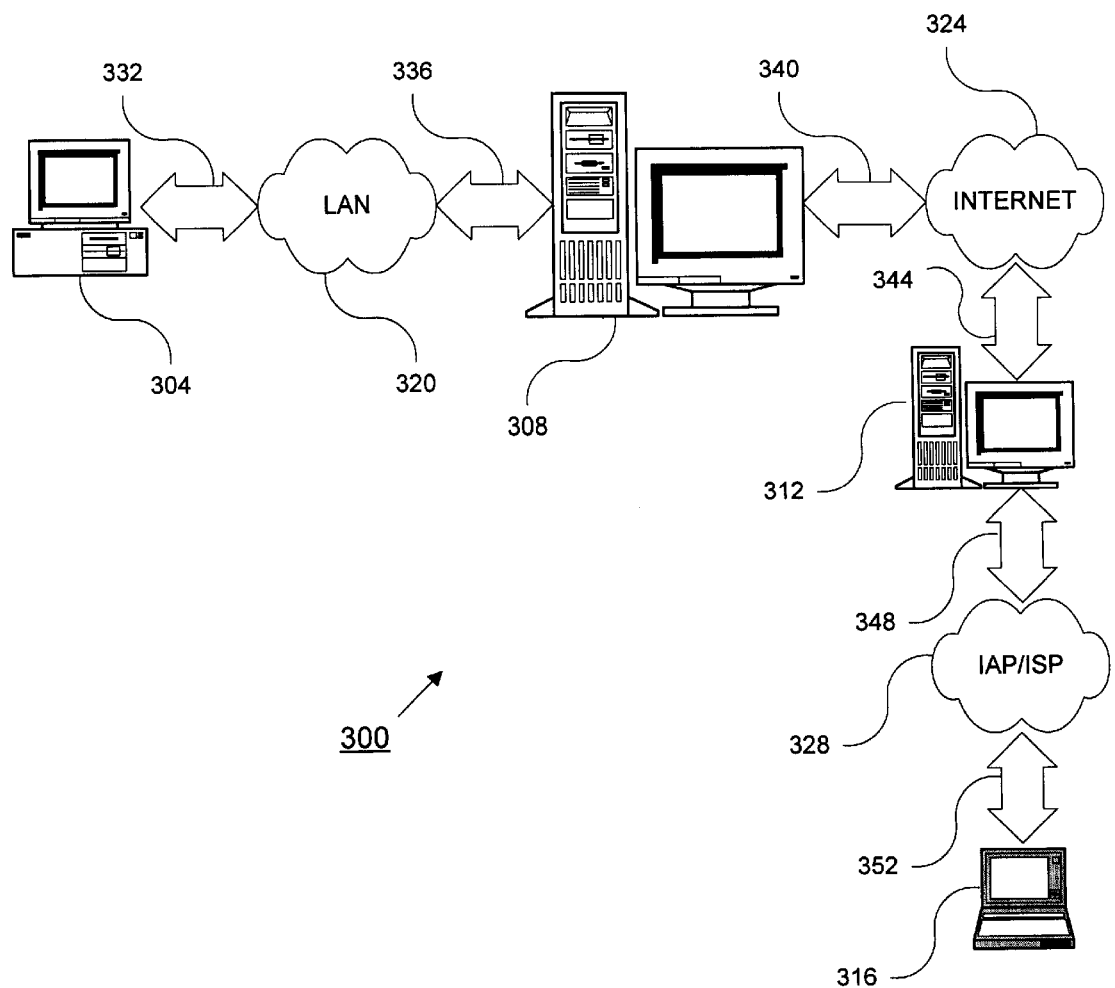
FIG. 3 depicts a network architecture in which the present invention can be employed.

FIG. 3 depicts network architecture 300 in which the present invention is employed. User terminal 304, server 308, server 312 and laptop 316 are all embodiments of computer 200. Server 308 is configured to run a database server. The server 308 can also be configured to concurrently run a database server and application program. Server 312 is configured to run an application server.

The server 308 is connected to a user terminal 304 via a local area network ("LAN") 320. Network interfaces 332 and 336 interlink the local area network 320 to the user terminal 304 and server 308.

According to one embodiment of the present invention, only a single server is needed to execute the methods and techniques described herein. However, in an alternative embodiment, an n-tiered network architecture can also be employed, such as where a database server residing on a first server is accessed through a separate server, such as an application server. An application server is commercially available from Oracle Corporation in Redwood Shores, Calif. <http://www.oracle.com>.

According to an n-tiered model, n-2 layers of servers are interposed between the database server (e.g., running on server 308) and a user application (e.g., a client running on a terminal device). Such an environment allows for a highly distributed network environment whereby the processes and techniques described herein can be individually assigned to particular servers. According to one embodiment, when an n-tiered network architecture is employed, connections to the server 308 are by way of a proxy user session. Accordingly, a user session is maintained between the terminal unit (e.g., laptop 316) and the server 312, and a proxy user session is maintained between the server 312 and the server 308. A three-tiered model is described below with reference to FIG. 7.

For convenience, server 308 will be referred to hereafter as database server 308, while server 312 will be referred to hereafter as application server 312. It should be noted that application server 312 is referred to as an "application server", when in fact it preferably provides not only the application program functionality, but also web server functionality. For example, application server 312 provides an interface between the application program and a web browser residing on laptop 316 (such as the Netscape -Navigator available from Netscape Corporation in Mountain View, Calif. <http://www.netscape.com>). Furthermore, a proxy server, which provides a cache for objects that lie on other servers (e.g., the database server 308), is preferably part of the application server 312. A proxy user session, as used herein, is a session established between the database server 308 and a user by way of the proxy server.

The application server 312 is connected to the database server 308 and the laptop 316. The application server 312 is connected to the database server 308 via a wide area network, such as internet 324. Network interfaces 340 and 344 interlink the internet 324 to the database server 308 and the application server 312. The application sever 312 is further connected to the laptop 316 via an internet access provider ("IAP") and/or an internet service provider ("ISP"), such as IAP/ISP 328. Again, network interfaces 348 and 352 interlink IAP/ISP 328 to application server 312 and laptop 316.

TERMINOLOGY

As used herein, "schema" refers to a named collection of database objects (e.g., tables, views, clusters, packages, procedures, etc.) usually used for a particular purpose. For example, a schema can be a set of electronic commerce tables and procedures used for the purchase of goods over the world-wide web. The schema may be called "e_commerce". Similarly, the schema may be a set of inventory objects referred to as the "inventory" schema. An application program can employ one or more schemas, just as one schema can support more than one application program.

As used herein, a "role" refers to a classification of a user. (For example, a "user" can be an actual end-user typing at a terminal unit, or a user can be an application program.) Any user associated with a role has certain privileges. For example, some users only have "read" privileges (e.g., "user" role), i.e., the fewest database privileges, while other users have the greatest database privileges (e.g., "admin" role), i.e., full "write" privileges. Moreover, roles can specify any number of sets of database privileges that fall between the "user" and the "admin" role. When a user is designated a particular role, the role identifies the set of database privileges available to the user through that role. It is important to note that more than one role may be associated with a user. Furthermore, a role can be granted to another role.

According to a preferred embodiment, privileges include the right to execute SQL statements and to access another user's objects. For example, privileges include the right to connect to the database (create a session), to create a table, to select rows from another user's table, and to execute another user's stored procedure. At least two distinct categories of privileges are available, they are system privileges and schema object privileges.

A system privilege is the right to perform a particular action, e.g., to perform an action on any objects of a particular type. For example, the privileges to create a tablespace and to delete rows in any table in the database are system privileges.

A schema object privilege or "object privilege" is a right to perform a particular action on a specific table, view, sequence, procedure, function or package. Different object privileges are available for different types of schema objects. For example, the privilege to delete rows from a particular table is an object privilege.

According to one embodiment, some schema objects, such as clusters, indexes, triggers and database links, do not have associated object privileges. Rather, their use is controlled with system privileges. For example, to alter a cluster a user must own the cluster or have a system privilege to alter the cluster.

As used herein, a "package" is an encapsulated collection of related procedures, stored functions, and other program objects stored together in a database. (Note that the package can also be a single stored function, procedure or process module, but it is usually more.) The package "body" defines these objects. For example, a security package is a type of package that is used in the present invention.

According to one embodiment, a security package contains logic that is used to enable database privileges contained in a role. The security package, stored in disk storage, can specify tests, functions or criteria for various session parameters (e.g., variables or information corresponding to a particular session with a database server). The session parameters can be collected by a number of components, for example, the application program or user may collect or provide session parameters (e.g., IP address), or a security package function may query session parameters (e.g., the time of day, the weather, etc.). The session parameters can include subjective information (i.e., user-specific information such as a terminal ID, application name, context variables, and IP address), and objective information (i.e., general information such as date, time, and weather).

In an embodiment of the invention, object privileges for tables allow table security at the level of data manipulation language ("DML") and data dictionary language ("DDL") operations. For example, DML operations include DELETE, INSERT, SELECT, and UPDATE DML. Exemplary DDL operations include ALTER, INDEX, and REFERENCE.

As used herein, an "execution call chain" is information stored in one or more frames of a call stack. The execution call chain identifies a string callers and/or functions that are being executed in a run-time environment.

Finally, and as used herein, the call stack is a data structure comprising a series of frames in which call information, usually function names and/or call identifiers, is stored. The calls identified in the call stack are generally performed in a last in, first out order. It is worth noting that when a function is said to be executed, this does not necessarily mean that the function is completed. For example, a first function call can be placed on the call stack and executed. While the first function is executing, the first function may call a second function. The second function call is added to the call stack (in addition to the first function call) and executed. The second function can similarly call additional functions, and those functions can call other functions. Generally, the function call information is not removed from the call stack until a function is completed. Thus, by tracing a chain of frames in the call stack, it is possible to determine whether a later called function (e.g., the second function) was called by and earlier function (e.g., the first function).

SECURITY PACKAGE EMBODIMENT

Figure 4:
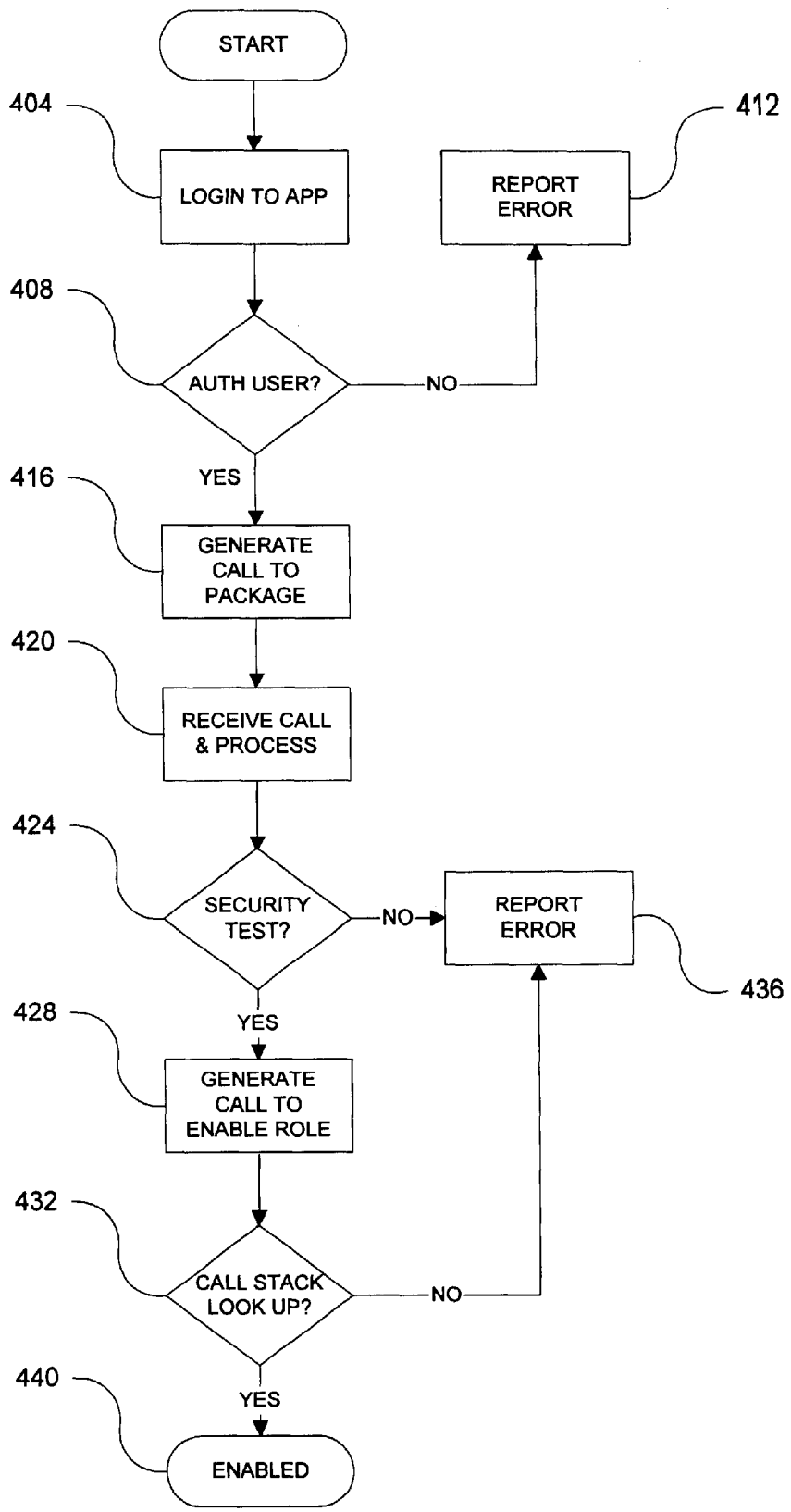
FIG. 4 is a flowchart depicting a preferred embodiment of the present invention.

Turning now to FIG. 4, it depicts a flowchart of a presently preferred embodiment of a method for enabling database privileges for a role.

In act 404, a user logs in to an application program. In act 408, a test is performed to ensure the user is authorized to use the application program. The test performed in act 408 is defined by an application programmer, who decides the particular security or session parameters needed to authenticate the user (e.g., a password). If the test at act 408 failed, then an error message is returned to the user at act 412. However, if the test is successful, then processing continues to act 416. (It is presumed that the application program will establish a session with the database server after successfully authenticating the user. Further, note that the test described with reference to acts 404 through 412 are optional and are not necessary for the present invention.)

In act 416, the application program generates a call to a package. According to one embodiment, the call can be a call to a general function (e.g., a procedure to generate a report) that does not directly identify a role or a group of database privileges to be enabled, or it can be a call to a specific function that directly identifies the role or group database privileges to be enabled.

In act 420, the call to the package is received at the database server and processed. According to a preferred embodiment, the package is a PL/SQL package that is executed in the database server on behalf of the application program. According to one embodiment, when the call to the package is processed, a PL/SQL engine identifies a role associated with the function identified in the call in act 416. The package, in turn, calls a security package defined in a schema associated with the function. According to one embodiment, the schema and the security package names are stored in one or more frames of the PL/SQL engine's run-time call stack that is contained in the main memory.

Processing the call to the security package will cause one or more user-defined security package functions to be triggered. (An exemplary security package function is described below with reference to Tables 2 and 3.)

In act 424, the PL/SQL engine executes one or more modifiable security package functions from the security package. The security package functions collect and test objective and/or subjective session parameters. The security package functions can directly define the acts to be performed, or the security package functions can call external processes (e.g., other stored procedures) that define the acts to be performed. Executing the one or more security package functions and comparing the collected session parameters against predefined, authorized session parameters verifies that the security package criteria are satisfied. If the one or more security package functions indicate that all of the session parameters were successfully authorized, then processing continues to act 428. Otherwise, processing continues to act 436.

In act 428, a call to enable a role is generated by the security package function. Preferably, the call to enable the role is invoked within a security package function. According to a preferred embodiment, the call to enable a role is performed by a database kernel, rather than by the PL/SQL engine. In act 432, the database kernel performs a call stack lookup, where it examines its data dictionary and determines which schema and security package names are associated (or "trusted") with the particular role to be enabled. Then the database kernel searches the frames of the PL/SQL run-time call stack for the trusted schema and security package names. If the trusted names are verified in the PL/SQL run-time call stack, then the database kernel is assured that the call to the security package was received over trusted security logic (for example, an authorized execution call chain). However, if the trusted names cannot be verified, then the call was not received over trusted security logic.

According to the embodiment described above, it is noted that the security package name, rather than the function name, is verified on the call stack. This is because if the security package name is identified on the call stack, then each of the security functions identified therein is a trusted security function. However, it can also be that the function name is instead or additionally verified.

If the trusted security logic is verified, then processing continues to act 440 where database privileges are enabled for the duration of the session. Otherwise, in act 436, an error is reported to the application program that caused the security package to be called. It is up to the application program to determine how to process the error message.

It is worth noting that the present invention is described above with reference to the PL/SQL programming environment (available from Oracle Corporation in Redwood Shores, Calif.). However, in alternative embodiments, other programming environments can be employed without departing from the broader spirit of the invention. For example, the Java programming environment available from Sun Microsystems in Mountain View, Calif. <http://www.sun.com>, or the ActiveX programming environment available from Microsoft Corporation in Redmond, Wash. <http://www.microsoft.com>, or any other equivalent programming environment can be used. Moreover, the invention can involve a more general data structure than a "package" or "security package" as is described above. Accordingly, other data structures, such as modules, capsules, remote procedure calls, or other functions can be employed.

EXEMPLARY SYNTAX

Exemplary syntax for identifying trusted schema and security package names associated with a role is shown below in Table 1. The structure of the CREATE ROLE extension is as follows: CREATE ROLE <role name> IDENTIFIED USING <schema>.<package>. The significance of the CREATE ROLE extension is that it identifies an authorized or trusted security logic (for example, a trusted execution call chain identifying a schema name and a security package name through which a particular role (e.g., purchasing, buyer, manager) can be enabled). The syntax shown in Table 1 is used by a database administrator to setup the database's data dictionary (or metadata repository) to identify such information. The contents of the data dictionary are examined when performing a call stack lookup, and more specifically when verifying that information (e.g., application and/or function names) in one or more frames of the call stack corresponds to the trusted security logic.

TABLE 1

CREATE ROLE purchasing
    IDENTIFIED USING inventory.security-pkg;
CREATE ROLE buyer
    IDENTIFIED USING e-commerce.security-pkg;
CREATE ROLE manager
    IDENTIFIED USING hr.security-pkg;

Table 2 depicts a security package function definition. The security package function verifies that the security package criteria are met and then calls a database server kernel function to enable a role (e.g., dbms_session.set_role ('admin role')). Here, the security package function is associated with the procedure (or function) hr_app_report.

TABLE 2

CREATE OR REPLACE PACKAGE BODY hr_admin IS
PROCEDURE hr_app_report
AUTHID CURRENT USER AS
BEGIN
    /* set application context in 'responsibility' namespace */
    hr_login.hr_set_responsibility;
    /* authentication check here */
    if (Hr.MySecurityCheck = TRUE) then
        /* verify 'responsibility' is set, enable role */
        if (sys_context ('hr' , 'role') = 'admin') then
            dbms_session.set_role( 'admin_role');
        else
            dbms_session.set role('staff_role');
        end if;
    end if;
END;

Table 3 depicts a security procedure (or test) that is called from Table 2. Here, the security procedure is defined in a process external to the security package function. The security procedure shown in Table 3 is particularly useful in network embodiments where a middle-tier server is employed and a proxy user is verified.

TABLE 3

```
CREATE OR REPLACE FUNCTION hr.MySecurityCheck RETURN BOOLEAN AS
BEGIN
    /* check if session is authenticated by proxy user */
    if (sys_context ('userenv','proxy_user') = 'SCOTT')
    then
        return TRUE;
    else
        return FALSE;
    end;
END;
```

As Tables 2 and 3 illustrate, programmically modifying the security package functions is straight-forward. Accordingly, rather than employing a strict and static secret-based security system for enabling database privileges, the methods and techniques of the present invention allow for a high degree of modification. Moreover, the modification can be performed in a single location, thus making administration and maintenance of the privilege functions less burdensome than in a static (e.g., a password-based) or a highly distributed security system.

Finally, it should be noted that the exemplary data structures mentioned above, such as those referred to as "packages" or "security packages" can instead be other general purpose modules or functions. Accordingly, the syntax provided above could be modified to accommodate such changes.

Similarly, in one embodiment, only one test for a trusted security logic name is made of the call stack. In such an embodiment, it is possible to test for a trusted application name or to test for a more specific security function name, such as the schema name and/or security package name, as might be the case where only one security function corresponds to an application. Testing for only an application name is useful when the application can be trusted to enforce security.

However, when the application cannot be trusted to enforce security logic, there might be other tests that the database would like to test, that, until now, there was no convenient method for testing. Accordingly, in another embodiment, two tests for trusted security logic can be performed. The first test can verify the trusted application name and the second test can verify a trusted security function name. Verifying that a security function that is not modifiable by an end user has been executed is one method for forcing that certain security tests are performed. Consistent with such an embodiment, the data dictionary (or metadata repository) can comprise multiple types of trusted security logic information.

In still another embodiment, one or more tests for trusted security logic can include a test for context attributes, such as program variables, associated with the session. The context attributes, rather than a function name, identify the trusted security logic. A context attribute method and mechanism is described in U.S. patent application Ser. No. 09/167,092, entitled, "DATABASE FINE-GRAINED ACCESS CONTROL", filed Oct. 5, 1998, which is incorporated herein by reference in its entirety. The data dictionary can be modified to comprise the trusted security logic identifying the context attribute information. Such an embodiment can be used to eliminate passwords altogether.

SECURITY POLICY EMBODIMENT

Figure 5:
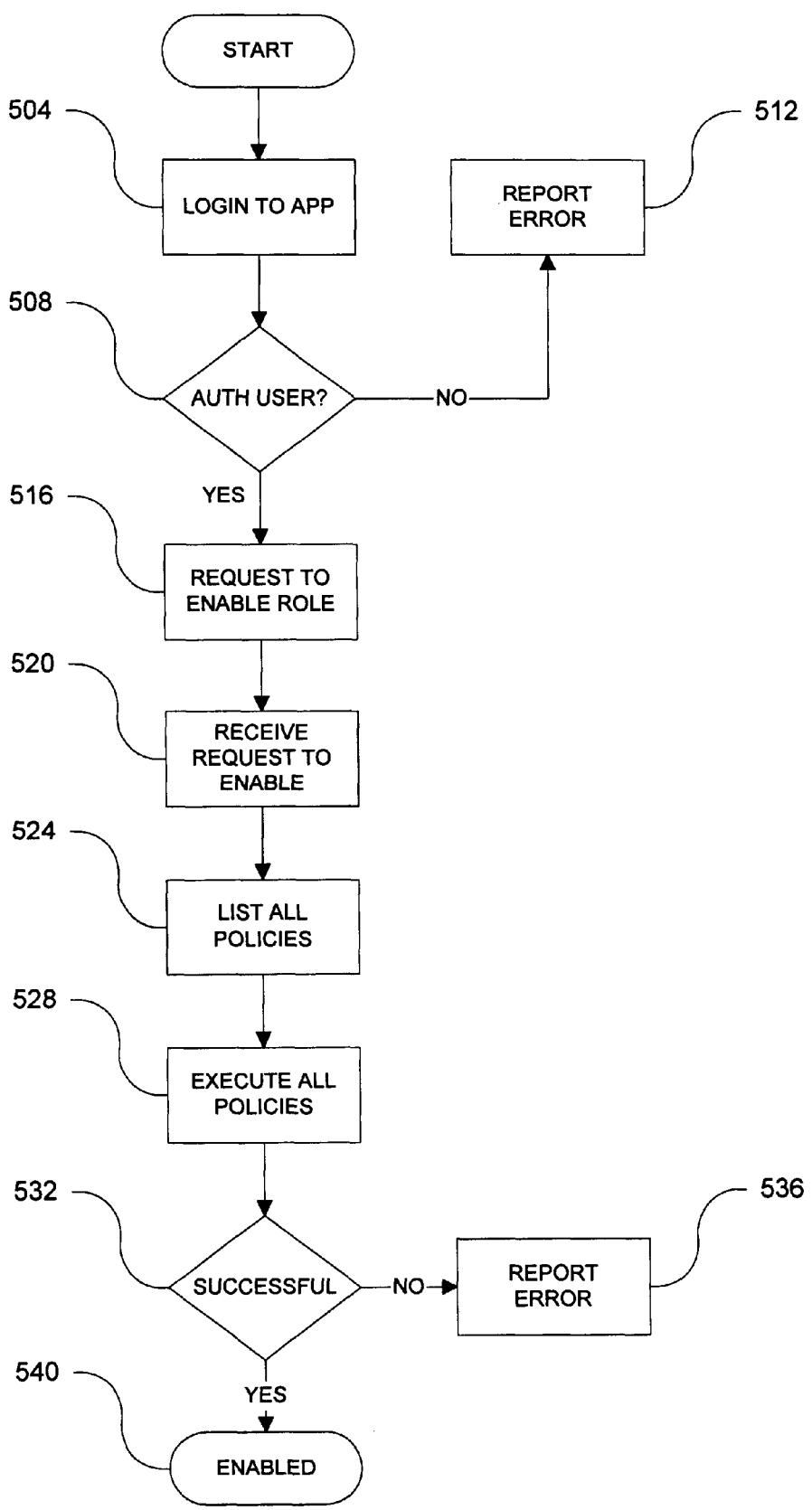
FIG. 5 is a flowchart depicting an alternative embodiment of the present invention.

FIG. 5 is a flowchart depicting an alternative method for enabling database privileges. In act 504, a user logs in to the application program. In act 508, the application program authenticates the user. If the authentication is not successful, then an error message is generated and returned to the user at act 512. However, if the authentication is successful, then processing continues to act 516.

In act 516, the application program generates a request to enable a role associated with the user. For example, the request to enable the role is embodied in a remote procedure call to the database server. In act 520, the request to enable the role is received at the database server, and in act 524 the database kernel process generates a list of all of the policies associated with the role to be enabled. According to one embodiment, the database kernel process generates the list of all the policies by reading its data dictionary and selecting all of the policies associated with the role to be enabled.

Next, in act 528, the database server executes all of the policies identified in the list. Executing the policies includes performing one or more modifiable security functions in each policy. The policies can be PL/SQL functions that collect objective and/or subjective information concerning the session (for example, context attributes, proxy user information, function names, time, and weather). Preferably each of the policies, when executed, returns a value indicating whether the execution of the policy was successful.

In act 532, a test is performed to determine whether all of the polices successfully executed. If any of the policies were not successful, then an error is reported to the application program in act 536. The application program handles the error report in a manner appropriate to the circumstance and may optionally return a notice to the user. However, if all of the policies successfully executed, then database privileges are enabled in act 540.

As was the case in the other embodiments, processes other than remote procedure calls can be employed in keeping with the broader spirit of the invention. For example, the security packages described above can be used, as could be general modules or functions.

NETWORK FLOW DIAGRAMS

Figure 6:
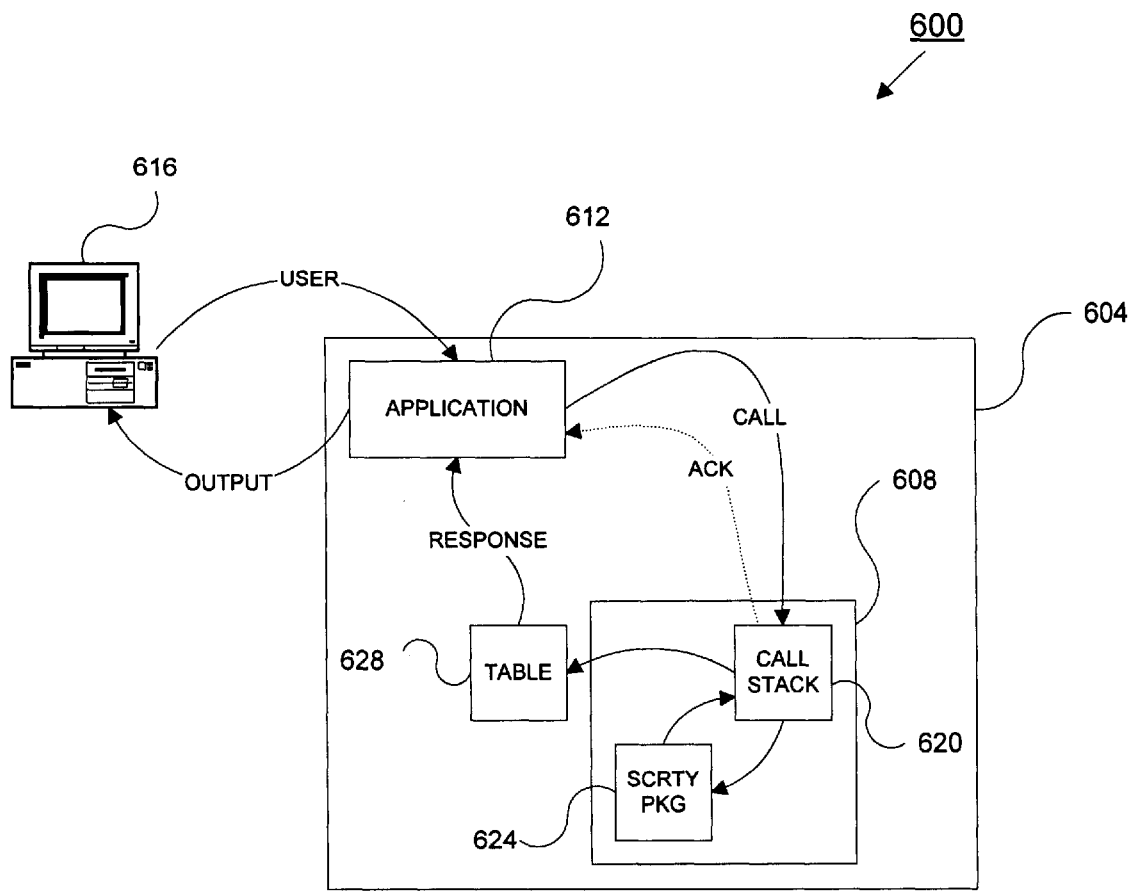
FIG. 6 depicts a flow diagram of a database security system according to the present invention.
Figure 7:
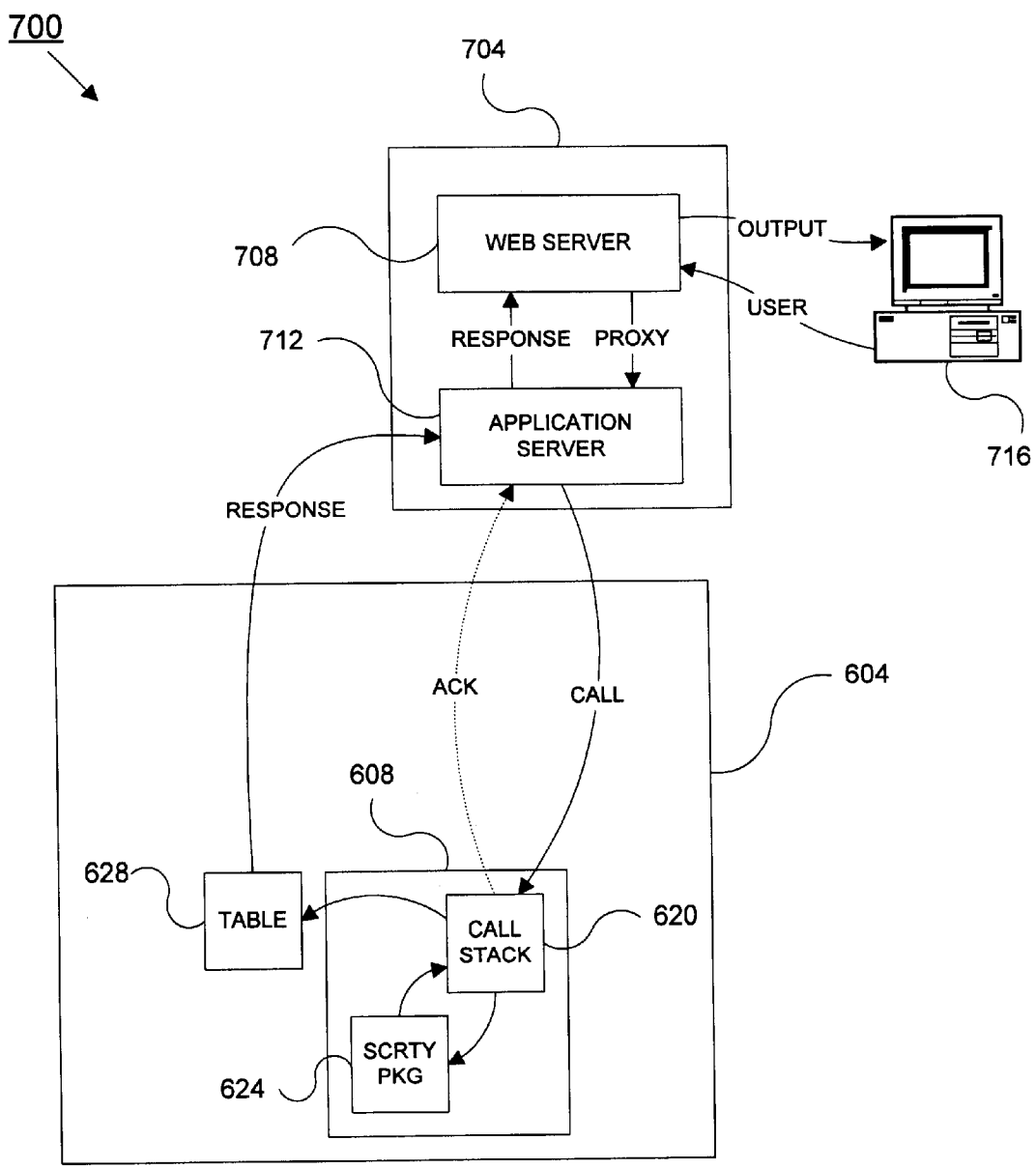
FIG. 7 depicts a flow diagram of a database security system according to an alternative embodiment of the present invention.
Figure 8:
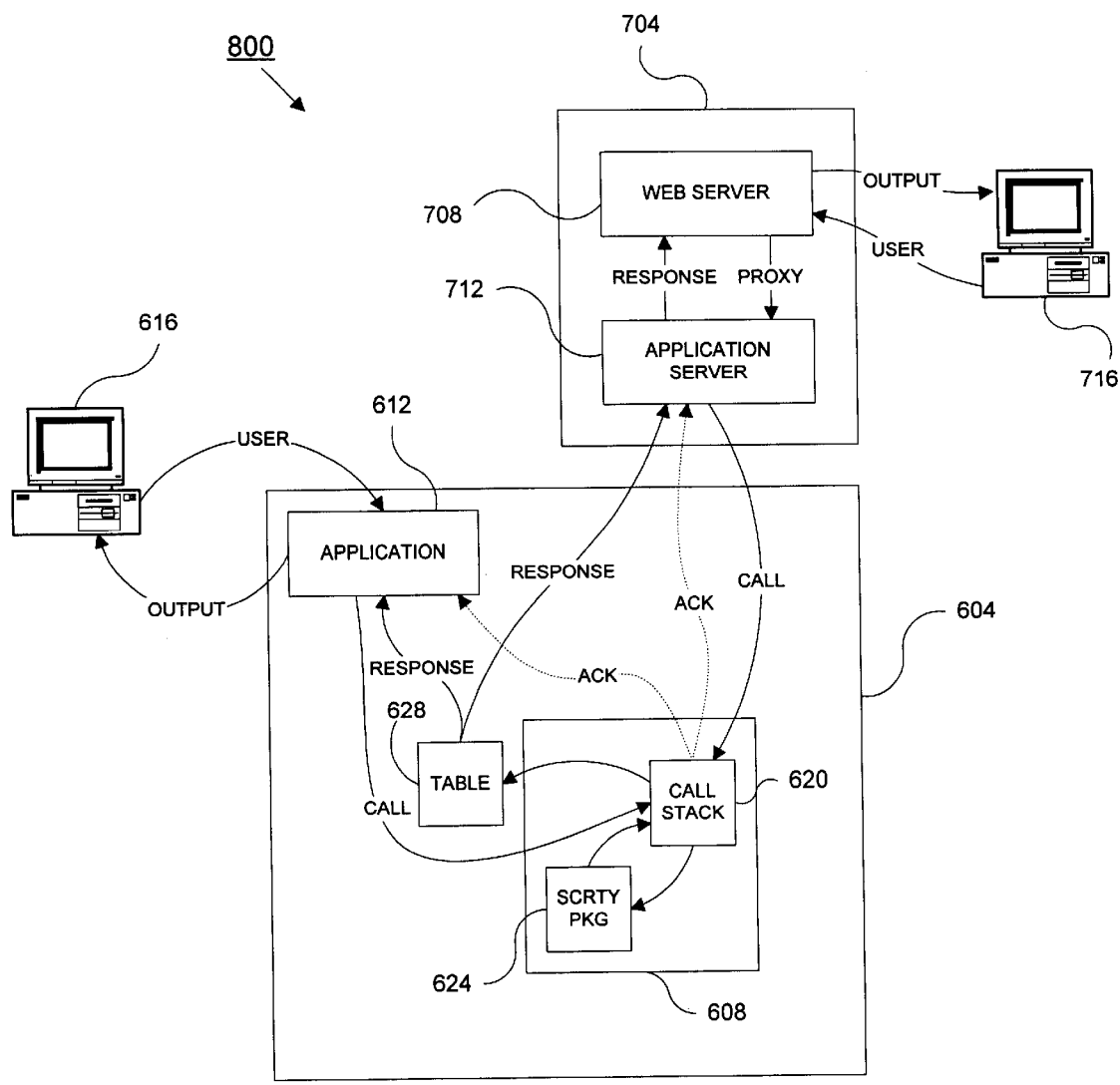
FIG. 8 depicts a flow diagram combining FIGS. 6 and 7.

FIGS. 6, 7 and 8 are flow diagrams of database security systems 600, 700 and 800 according to embodiments of the invention. It should be noted that the flow diagrams described hereafter show the general paths by which database privileges are traced, and not the precise data flow described with reference to the flow charts described above. Once database privileges have been enabled, so long as that session is maintained subsequent requests for data can be made without re-verifying the execution call chain.

In FIG. 6 a computer 604 is shown wherein the computer 604 includes a database server 608 (e.g., Oracle8i™ commercially available from Oracle Corporation), which is the engine for providing access to data associated with a database. Also shown in computer 604 are an application program 612 and a table 628. Separate from the computer 604, but communicatively coupled thereto, is a user interface 616.

From the user interface 616, a user logs in to the application program 612. The application program 612 authenticates the user. (The application program 612 will establish a database session with the database server 608 on behalf of the user.) The user may directly or indirectly request information stored in table 628. For example, the user may request that a particular function, such as a report, be performed. In order to perform the function, database privileges must be enabled for the user (e.g., via a role).

The application program 612 initiates a call to a package comprising the function. The call to the package can involve a call to a security package 624 associated with the function. According to one embodiment, the call to the security package 624 is a PL/SQL command identifying the role to be enabled, as well as a schema name and a security package name. The PL/SQL engine running on the database server 608 executes the PL/SQL command.

Data identifying the modules called (i.e., schema name and security package name) are stored in one or more frames of the PL/SQL run-time call stack 620—preferably contained in the main memory of the computer 604. The PL/SQL engine executes the call to the security package 624 by performing one or more security package functions specified therein. A test between one or more session parameters collected by the security package function and the authorized criteria stored in the security package 624 is performed.

After the PL/SQL engine successfully tests the one or more session parameters against the security package 624, the security package function invokes a call stack lookup function. The database kernel performs the call stack lookup function. The database kernel, by examining the database data dictionary, determines which schema and security package names are authorized to request to enable the designated role. The database kernel then searches the frames of the PL/SQL run-time call stack 620 for the trusted schema and security package names. According to one embodiment, if the names are found in the call stack 620, then the database kernel enables database privileges for the duration of the session. Once database privileges are enabled, then data from the table 628 can be returned to the application program 612, which formats the response data and outputs it to the user interface 616.

According to one embodiment, an acknowledgment signal is returned from the database server 608 to the application program 612 indicating the outcome of the test on the execution call chain (i.e., the call stack lookup function).

FIG. 7 depicts a three-tiered architecture employing a similar underlying database security system 700. Like components described with reference to FIG. 6 have like reference numerals in FIG. 7.

Additionally shown in FIG. 7 is a middle tier 704 comprising a web server 708 and an application server 712. Web server 708 is preferably configured to generate dynamic hypertext markup language or Java applets and to receive data from the user interface 716 (i.e., through a ASP, CGI, Java, or XML based interface). The web server 708 and application server 712 functionality can be incorporated into a single component. For example, Oracle Corporation offers a variety of application servers that incorporate both functionalities.

User interface 716 is preferably a computer running a web browser, such as the Netscape Navigator available from Netscape Corporation.

Following the flow diagram, a user logs in to the web server 708 via user interface 716. The web server 708 causes the application server 712 to establish a proxy user session with the database server 608. Similar to the method described above with reference to FIG. 6, the application server 712 generates a call to a package comprising a procedure. One difference between the flow described in FIG. 6 and that described in FIG. 7 is that database privileges can be enabled through a proxy user session established between the middle-tier 704 and the database server 608. If the system 700 checks a proxy user, then the system 700 can also enforce that a user is authenticated or connected to the database 604 through a trusted tier, such as the middle tier 704.

FIG. 8 is a diagram depicting an alternative embodiment of a database security system 800. Database security system 800 concurrently supports a database user session (between application program 612 and database server 608) and a proxy user session (between the application server 712 and the database server 608), as shown and described above with reference to FIGS. 6 and 7.

An inherent weakness of the prior password based systems was that if the password was compromised, there was no convenient method for confirming that the party providing the password is in fact the party authorized to use the password, or that other security tests have been performed. The present invention fixes these problems. A convenient, flexible and extensible method is provided for verifying that trusted security logic is performed. Moreover, rather than identifying the party requesting database privileges by way of a password, by verifying that a trusted package is attempting to enable a role. Thus, the present invention can be implemented with or without passwords.

According to one embodiment, an advantage of the present invention is that secret passwords do not have to be shared or maintained. Rather, the execution call chain (together with any session parameters) and information in the metadata repository are used to determine whether database privileges are enabled. Alternatively, successfully executing policies identified in a metadata repository causes database privileges to be enabled. The trusted security logic can be maintained internal to the database and does not need to be shared.

Furthermore, one or more session parameters used in a security package function (or policy) can be easily modified based on virtually any input or external values the system administrator desires, such as time, date, weather, context attributes, and/or a value from a third party source. Moreover, the ability to modify the security package functions without having to modify information embedded in the application program can reduce database privilege enablement maintenance. At the same time, the trusted security logic maintained internal to the database prevents rogue programmers from bypassing required security logic.

The methods and techniques described herein remove the burden of password maintenance from the database administrator. Now, database privileges can be enabled based on verifying an execution path. The invention allows for a highly extensible authorization process that is easier for an administrator to modify. The burden of database security can be distributed among the application developers, while at the same time the database administrator retains a convenient method for verifying that security logic is enforced. Even if a particular end application employs relaxed security constraints, the database administrator still has the option of limiting database privilege enablement to the end user by employing security package functions that are outside of an application developer's control.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for enabling privileges comprising:

receiving a request to enable a role;

generating a list of security policies associated with the role, the list of security policies selected from a metadata repository;

executing each security policy identified in the list by performing one or more modifiable security functions in each policy;

returning a value indicating a successful or unsuccessful execution of each security policy; and enabling database privileges associated with the role if the value returned by all the executed security policies indicates each was successful.

2. The method of claim 1, wherein said act of executing each security policy comprises:

collecting one or more session parameters; and comparing said one or more session parameters to authorized session parameters specified in the security policy.

3. The method of claim 1, wherein said act of executing each security policy comprises verifying one or more frames in a call stack corresponds to trusted security logic stored in the metadata repository.

4. The method of claim 1, wherein said act of executing each security policy comprises verifying a proxy user.

5. A computer program product that includes a computer readable medium, the computer readable medium having stored thereon a sequence of instructions which, when executed by a processor, causes the processor to execute a process for enabling privileges, the process comprising:

receiving a request to enable a role;

generating a list of security policies associated with the role, the list of security policies selected from a metadata repository;

executing each security policy identified in the list by performing one or more modifiable security functions in each policy;

returning a value indicating a successful or unsuccessful execution of each security policy; and enabling database privileges associated with the role if the value returned by all the executed security policies indicates each was successful.

6. The computer program product of claim 5, wherein executing each security policy comprises:

collecting one or more session parameters; and comparing said one or more session parameters to authorized session parameters specified in the security policy.

7. The computer program product of claim 5, wherein executing each security policy comprises verifying one or more frames in a call stack corresponds to trusted security logic stored in the metadata repository.

8. The computer program product of claim 5, wherein executing each security policy comprises verifying a proxy user.

9. A system for enabling privileges comprising:

means for receiving a request to enable a role;

means for generating a list of security policies associated with the role, the list of security policies selected from a metadata repository;

means for executing each security policy identified in the list by performing one or more modifiable security functions in each policy;

means for returning a value indicating a successful or unsuccessful execution of each security policy; and means for enabling database privileges associated with the role if the value returned by all the executed security policies indicates each was successful.

10. The system of claim 9, wherein means for executing each security policy comprises:

means for collecting one or more session parameters; and means for comparing said one or more session parameters to authorized session parameters specified in the security policy.

11. The system of claim 9, wherein means for executing each security policy comprises means for verifying one or more frames in a call stack corresponds to trusted security logic stored in the metadata repository.

12. The system of claim 9, wherein means for executing each security policy comprises means for verifying a proxy user.

* * * * *